No. 799,027. PATENTED SEPT. 12, 1905.
M. E. BODDY.
ROPE HITCH.
APPLICATION FILED FEB. 24, 1905.
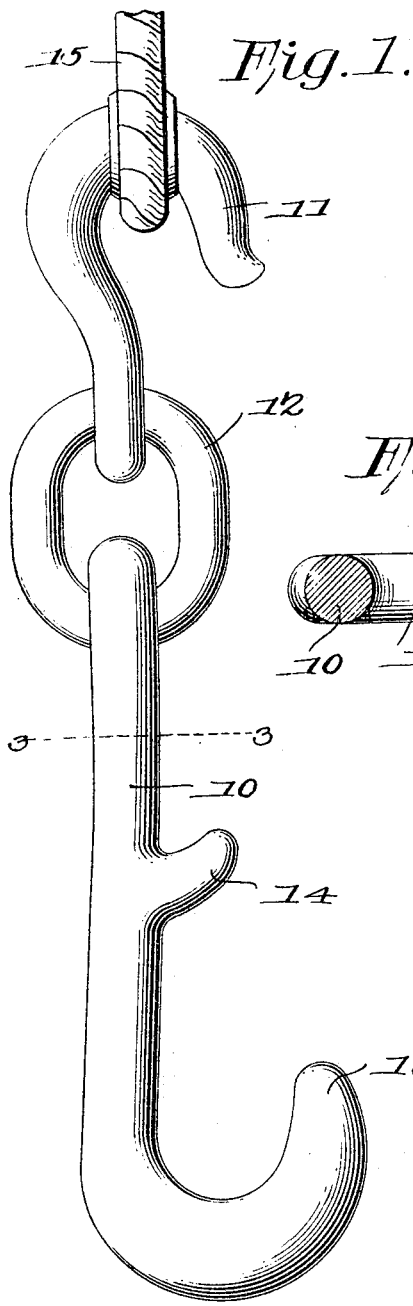
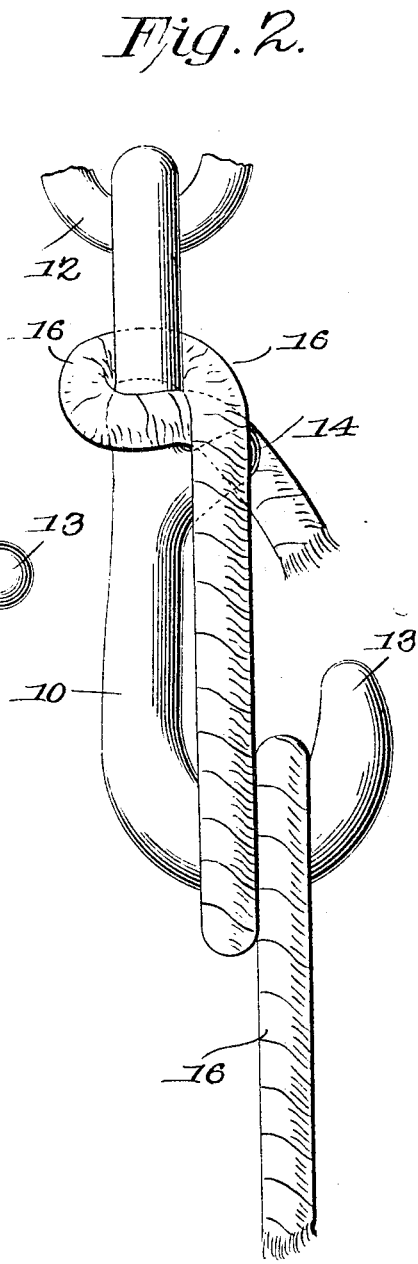
Michael E. Boddy,
Inventor
Witnesses
by C. A. Snow & Co.
Attorneys

UNITED STATES PATENT OFFICE.

MICHAEL E. BODDY, OF CARSONVILLE, MICHIGAN, ASSIGNOR OF ONE-HALF TO EDWARD BODDY, OF CARSONVILLE, MICHIGAN.

ROPE-HITCH.

No. 799,027.      Specification of Letters Patent.      Patented Sept. 12, 1905.

Application filed February 24, 1905. Serial No. 247,187.

*To all whom it may concern:*

Be it known that I, MICHAEL E. BODDY, a citizen of the United States, residing at Carsonville, in the county of Sanilac and State of Michigan, have invented a new and useful Rope-Hitch, of which the following is a specification.

This invention relates to devices for quickly and securely fastening the end of a rope or cable without tying knots therein, and has for its object to produce a simply-constructed member around which the end of the rope may be entwined and securely held in place only by the strain upon the cable.

With this and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings thus employed, Figure 1 is a side elevation of the improved device without the cable, and Fig. 2 is a similar view with the rope applied. Fig. 3 is a transverse section on the line 3 3 of Fig. 1.

The improved device comprises a stock 10, of metal, of suitable size and with a hook 11 connected flexibly thereto at one end by a link 12 and with an integral hook 13 extending laterally therefrom at the other end. Intermediately of the stock 10 is a stud 14, extending laterally therefrom and preferably inclined away from the integral hook, as represented.

The flexible hook 11 is designed to be connected to any required draft appliance, as indicated at 15, and the integral hook 13 and integral stud 14 are designed to receive a rope or cable 16, disposed in such a way as to avoid slipping no matter how heavy the strain may be and without the necessity for tying knots in the cable or rope.

The preferable manner of fastening is to place the cable over the stud 14 and then pass it around the stock 10 and over the portion of the cable upon the stud and bearing upon the same and once or more times around the larger hook 13, as in Fig. 2. By this simple arrangement the friction is so great that the cable will be firmly held from slipping no matter how strong the strain may be—in fact, a cable thus held will break before it will "part" or be fractured.

The device may be inexpensively manufactured and proportioned to any size of rope or cable and employed wherever a "quick hitch" is required.

Having thus described the invention, what is claimed is—

A rope-fastener consisting of a shank having means at one end for connection to a draft appliance and with a laterally-curved hook at the other end, and a stud extending laterally of said shank intermediate its length and in the same plane and in the same direction as said hook.

In testimony that I claim the foregoing as my own I have hereto affixed my signature in the presence of two witnesses.

his
MICHAEL  ×  E. BODDY.
                   mark

Witnesses:
   WM. J. MCCAREN,
   SAM BODDY.